(12) United States Patent
Seo et al.

(10) Patent No.: US 8,180,881 B2
(45) Date of Patent: May 15, 2012

(54) APPARATUS FOR ANALYZING THE PACKET DATA ON MOBILE COMMUNICATION NETWORK AND METHOD THEREOF

(75) Inventors: Kyoung-Il Seo, Seoul (KR); Yong-Beom Kim, Gyeonggi-do (KR); Sung-Chul Kim, Gyeonggi-do (KR); Soo-Kil Lee, Gyeonggi-do (KR); Seung-Chul Lee, Gyeonggi-do (KR); Kyoung-Sool Kim, Gyeonggi-do (KR)

(73) Assignee: KT Corporation, Seongnam (KR)

( * ) Notice: Subject to any disclaimer, the term of this patent is extended or adjusted under 35 U.S.C. 154(b) by 1213 days.

(21) Appl. No.: 10/534,839

(22) PCT Filed: Nov. 13, 2003

(86) PCT No.: PCT/KR03/02446
§ 371 (c)(1),
(2), (4) Date: May 13, 2005

(87) PCT Pub. No.: WO2004/045143
PCT Pub. Date: May 27, 2004

(65) Prior Publication Data
US 2006/0015576 A1   Jan. 19, 2006

(30) Foreign Application Priority Data

Nov. 13, 2002  (KR) .................. 10-2002-0070357
Nov. 13, 2002  (KR) .................. 10-2002-0070358
Nov. 13, 2002  (KR) .................. 10-2002-0070359

(51) Int. Cl.
*G06F 15/173* (2006.01)
(52) U.S. Cl. ................... 709/224; 709/223; 709/225
(58) Field of Classification Search .............. 709/224
See application file for complete search history.

(56) References Cited

U.S. PATENT DOCUMENTS
6,493,547 B1 * 12/2002 Raith .......................... 455/405
(Continued)

FOREIGN PATENT DOCUMENTS
EP   0938222 A3   8/1999
(Continued)

OTHER PUBLICATIONS

Sigeo Yamaguchi; *ASTEC Eyes on the net: ASTEC Product*; UNIX User; Jan. 2002; pp. 24-25; vol. 11, No. 1; Soft Bank Publishing Company; Japan.

(Continued)

*Primary Examiner* — Jeffrey Pwu
*Assistant Examiner* — Shripal Khajuria
(74) *Attorney, Agent, or Firm* — Alston & Bird LLP

(57) ABSTRACT

A packet data analyzer on a mobile communication network for analyzing packet data traffic, monitoring services, generating billing information per data service, and monitoring the network based on a protocol analysis, comprises a packet data separator provided between one of a mobile communication exchange and a packet controller that provide a wireless data service to the subscriber, and the service server, for separating user packet data transmitted between one of the mobile communication exchange and the packet controller and the service server, and receiving the user packet data; a traffic analyzer for separating the user packet data received through the packet data separator according to transmission directions, and analyzing the user packet data; a statistics storage unit for storing and managing result data analyzed by the traffic analyzer; and a statistics reference unit for retrieving data stored in the statistics storage unit, and providing statistical information desired by the user.

19 Claims, 15 Drawing Sheets

U.S. PATENT DOCUMENTS

| | | | |
|---|---|---|---|
| 6,515,989 B1 * | 2/2003 | Ronneke | 370/389 |
| 6,947,408 B1 * | 9/2005 | Liberti et al. | 370/345 |
| 6,980,793 B2 * | 12/2005 | Lee | 455/406 |
| 2001/0021176 A1 * | 9/2001 | Mimura et al. | 370/235 |
| 2002/0105911 A1 * | 8/2002 | Pruthi et al. | 370/241 |

FOREIGN PATENT DOCUMENTS

| | | |
|---|---|---|
| EP | 1014623 A2 | 6/2000 |
| JP | 05-292123 | 5/1993 |
| JP | 2001352328 | 12/2001 |
| KR | 2002085898 A | 11/2002 |
| WO | WO 01/88731 A1 | 11/2001 |

OTHER PUBLICATIONS

Read TCP/IP Firewall Introduction; *Network Magazine*; Apr. 2002; p. 58; vol. 7, No. 4; Aski Company; Japan.

* cited by examiner

APPARATUS FOR ANALYZING THE PACKET DATA ON MOBILE COMMUNICATION NETWORK AND METHOD THEREOF

BACKGROUND OF THE INVENTION (a) Field of the Invention

The present invention relates to a packet data analysis on a mobile communication network. More specifically, the present invention relates to a packet data analyzer and a method thereof for analyzing packet data and protocols transmitted on the IP (Internet protocol) network to provide various statistics, providing monitoring information for each service to a user through the analysis, totally monitoring a data network, and generating billing information for each wireless data service.

(b) Description of the Related Art

A domestic mobile communication service method by commercializing digital mobile stations, in particular, the CDMA (code division multiple access) type wireless service standard adopts the North America standard IS-95A (Interim Standard-95A), and the IS-95B partially supplements the IS-95A network and executes high-speed data services while maintaining the compatibility with the existing IS-95A. The IS-95A and IS-95B belong to the second generation (2G) in the evolution progress of the mobile communication networks.

The cdma2000-1x that belongs to the third generation (3G) thereof has improved bandwidths and data rates of the IS-95A/B, and is also referred to as the IS-95C.

When a subscriber who uses the mobile communication network, more specifically the IS-95A/B and the cdma2000-1x networks, desires to receive a data service, the subscriber accesses the corresponding network by the PPP (point-to-point protocol) to be connected to the Internet, and receives a wireless data service from a specific server.

In detail, as shown in FIG. 1, when the subscriber 10 requests a wireless data communication in the 2G IS-95A/B network, the subscriber 10 PPP-accesses an IWF (inter working function) 40 through a BTS (base transceiver station) and BSC (base station controller) 20 and a PCX (PCs exchange) 30, and is connected to a service server 60 by the PPP-access, and accordingly, the wireless data communication for the subscriber 10 is performed.

When the subscriber 10 requests a wireless data communication in the 3G cdma2000-1x network, the subscriber 10 PPP-accesses a PDSN (packet data serving node) 40 through the BTS/BSC 20 and a PCF (packet control function) 30, and receives the wireless data service from the service server 60 as shown in FIG. 1.

A subsequent system after the IWF or the PDSN 40 in the wireless data service system configured as shown in FIG. 1 includes an IP network such as the Ethernet.

Analysis of the packet data traffic in the above-configured IP network depends on the statistics provided by the IWF, the PDSN 40, an S/H (switching hub) which is an IP instrument, or a router, but the statistics are insufficient for analyzing various types of packet data traffic since the statistics provide restricted statistical information to the user for the proper maximum performance of systems.

The respective systems of from the BTS/BSC 20 to the S/H and router 50 only manage the systems themselves or connection states of links connected to them, and it is impossible for a mobile communication network management service provider to monitor the service.

As shown in FIG. 2, when a subscriber 15 requests wireless data in the 3G cdma2000-1x, the subscriber 15 PPP-accesses the PDSN 35, and accesses AAA (authentication authorization accounting) 45 to authenticate the subscriber and perform a billing process, and is allowed to receive a desired wireless data service from the service server 65. In this instance, a PCF 25 is connected to the PDSN 35 by using an A11 protocol, and the PDSN 35 is connected to the AAA by using a RADIUS (remote authentication dial-in user service) protocol.

Components provided after the PCF 25 in the wireless data service system configured as shown in FIG. 2 include an IP network such as an Ethernet. Respective systems including the PCF 25, the PDSN 35, and the AAA 45 manage the systems themselves or connection states of the links connected to the systems only, and it is impossible for the mobile communication network management service provider to wholly monitor the data network following the protocol analysis of the transmitted packet data.

It is impossible to apply various fees according to the user's usage of various services since the subscriber 10 is billed by a time billing method for calculating a data service use time and a packet billing method for calculating a total amount of used packets in the wireless data service system of FIG. 1. For example, the wireless data service provides a data service for processing a small amount of capacity on the text basis and a data service for processing a large amount of capacity such as the VOD (video on demand), but it fails to perform different billing depending on the various services.

SUMMARY OF THE INVENTION

It is an advantage of the present invention to provide a device and method for analyzing packet data traffic on a mobile communication network for providing system link management for providing stable services, and various types of statistical information for effective network investment by effectively improving the analysis of the packet data traffic on the mobile communication network.

It is another advantage of the present invention to provide a service monitoring device and method by analyzing packet data traffic on a mobile communication network for monitoring a wireless data service provided through a mobile communication network and providing a more stable wireless data service to a subscriber.

It is still another advantage of the present invention to provide a network monitoring device and method based on a protocol analysis on a mobile communication network for totally monitoring a data network through a protocol analysis from packet data transmitted from the mobile communication network and providing a more stable wireless data service to a subscriber.

It is still yet another advantage of the present invention to provide a device and method for generating billing information for each data service based on a packet data analysis of a mobile communication network for generating per-service billing information according to a wireless data service used by each subscriber through analysis of the user data packets on the mobile communication network.

In one aspect of the present invention, an analyzer for packet data traffic transmitted between a subscriber and a service server when the subscriber uses a wireless data service of a specific service server through a mobile communication network, comprises: a packet data separator provided between one of a mobile communication exchange and a packet controller and the service server for providing a wireless data service to the subscriber, for separating user packet data transmitted between one of the mobile communication exchange and the packet controller and the service server, and receiving the user packet data; a traffic analyzer for separating the user packet data received through the packet data separator according to transmission directions, and analyzing the user packet data; a statistics storage unit for storing and managing result data analyzed by the traffic analyzer; and a statistics reference unit for retrieving various data stored in the statistics storage unit, and providing statistical information desired by the user.

The packet data separator is accessed to an Ethernet access between one of the mobile communication exchange and the packet controller and the service server, and separates the user packet data into transmit data and receive data, and receives them.

The traffic analyzer separates the user packet data received through the packet data separator into transmit data and receive data, and analyzes them.

The traffic analyzer analyzes a TCP transmission flow between one of the mobile communication exchange and the packet controller and the service server through the user packet data.

The statistics reference unit provides various real-time statistics data analyzed by the traffic analyzer to the user through a GUI.

In another aspect of the present invention, a method for analyzing packet data traffic transmitted between a subscriber and a service server when the subscriber uses a wireless data service of a specific service server through a mobile communication network, comprises: (a) separating user packet data transmitted between one of the mobile communication exchange and the packet controller that provide a wireless data service to the subscriber and the service server, and receiving the user packet data; (b) separating the user packet data received in (a) according to transmission directions, and analyzing the user packet data; and (c) providing statistical information desired by the user by using result data analyzed in (b).

In still another aspect of the present invention, a device for monitoring a service for a subscriber through an analysis of packet data traffic transmitted between the subscriber and a service server when the subscriber uses a wireless data service of a specific service server through a mobile communication network, comprises: a packet data separator provided between one of a mobile communication exchange and a packet controller that provide a wireless data service to the subscriber, and the service server, for separating user packet data transmitted between one of the mobile communication exchange and the packet controller and the service server, and receiving the user packet data; a traffic analyzer for separating the user packet data received through the packet data separator according to transmission directions, and analyzing the user packet data; a statistics storage unit for storing and managing result data analyzed by the traffic analyzer; and a service monitoring unit for generating information including normality states on the subscriber for each service through various data stored in the statistics storage unit, and providing the information to a manager.

In still yet another aspect of the present invention, a method for monitoring a service for a subscriber through an analysis of packet data traffic transmitted between the subscriber and a service server when the subscriber uses a wireless data service of a specific service server through a mobile communication network, comprises: (a) separating user packet data transmitted between one of the mobile communication exchange and the packet controller that provide a wireless data service to the subscriber, and the service server, and receiving the user packet data; (b) separating the user packet data received in (a) according to transmission directions, and analyzing the user packet data; and (c) generating information including normality states on the subscriber for each service through result data analyzed in (b), and providing the information to a manager.

In still further another aspect of the present invention, a device for monitoring a network based on a protocol analysis through packet data traffic transmitted between a subscriber and a service server when the subscriber uses a wireless data service of a specific service server through a mobile communication network, comprises: a first packet data separator provided between a packet controller for providing a wireless data service for the subscriber and a network linking device for allowing a wireless data service to the service server through the packet controller, for separating user packet data transmitted between the packet controller and the network linking device, and receiving the user packet data; a second packet data separator provided between the network linking device and the service server, for separating user packet data transmitted between the network linking device and the service server, and receiving the user packet data; a first protocol analyzer for analyzing a protocol based on the user packet data received through the first packet data separator; a second protocol analyzer for analyzing a protocol based on the user packet data received through the second packet data separator; a statistics storage unit for storing and managing result data respectively analyzed by the first and second protocol analyzers; and a network monitoring unit for generating information including normality states on the network relating to the mobile communication network through various data stored in the statistics storage unit, and providing the information to a manager.

The first packet data separator is accessed to an Ethernet access between the packet controller and the network linking device, and separates user packet data into transmit data and receive data, and receives them, and the second packet data separator is accessed to an Ethernet access between the network linking device and the service server, and separates user packet data into transmit data and receive data, and receives them.

The first protocol analyzer separates a protocol structure into a transmit structure and a receive structure according to user packet data received by the first packet data separator, and the second protocol analyzer separates a protocol structure into a transmit structure and a receive structure according to user packet data received by the second packet data separator.

The first protocol analyzer analyzes RP registration and an authentication flow between the packet controller and the network linking device, and PPP (point-to-point protocol) data link setting, and a PPP IP allocation flow through the user packet data, and the second protocol analyzer analyzes a TCP transmission flow between the network linking device and the service server through the user packet data.

The data stored in the statistics storage unit include protocol access statistics for each base station, protocol access statistics for each network linking device, statistics for each protocol failure factor, PPP access statistics for each base station, PPP access statistics for each network linking device, and protocol message statistics.

A switching hub for transmitting packets to an appropriate port based in a packet address, and a router for connecting separated networks that use the same transmission protocol are connected between the second packet data separator and the service server.

In still further another aspect of the present invention, a method for monitoring a network based on a protocol analysis through packet data traffic transmitted between a subscriber and a service server when the subscriber uses a wireless data service of a specific service server through a mobile communication network, comprises: (a) respectively separating user packet data transmitted between a packet controller for providing a wireless data service for the subscriber and a network linking device for allowing a wireless data service to the service server through the packet controller, and user packet data transmitted between the packet controller and the service server, and receiving the user packet data; (b) analyzing a protocol based on the respective user packet data received in (a); and (c) generating information including normality states on the network relating to the mobile communication network through result data analyzed in (b), and providing the information to a manager.

In still further another aspect of the present invention, a device for generating billing information for each data service based on an analysis of packet data transmitted between a subscriber and a service server when the subscriber uses a wireless data service of a specific service server through a mobile communication network, comprises: a packet separator provided between one of a mobile communication exchange and a packet controller that provide a wireless data service to the subscriber, and the service server, for separating user packet data transmitted between one of the mobile communication exchange and the packet controller and the service server, and receiving the user packet data; a packet analyzer for finding service information used by the subscriber received through an analysis of the user packet data received through the packet separator, and outputting the service information as first billing information; and a billing information storage unit for combining the first billing information output by the packet analyzer and second billing information provided by the mobile communication exchange or the packet controller to store the combined information as single per-service billing information, and transmitting the subscriber's billing information which includes the per-service billing information to a specific billing process system so as to bill the subscriber.

The packet separator is accessed to an Ethernet access between one of the mobile communication exchange and the packet controller and the service server, and separates user packet data into transmit data and receive data, and receives them.

The packet analyzer uses the user packet data received through the packet separator to find information including a destination IP and a port number for each subscriber, and uses packet data used by the subscriber to find the subscriber's service usage information.

In still further another aspect of the present invention, a method for generating billing information for each data service based on an analysis of packet data transmitted between a subscriber and a service server when the subscriber uses a wireless data service of a specific service server through a mobile communication network, comprises: (a) separating user packet data transmitted between one of a mobile communication exchange and a packet controller and the service server, and receiving the user packet data; (b) finding service information used by the subscriber received through an analysis of the user packet data received in (a), and outputting the service information as first billing information; and (c) combining the first billing information output in (b) and second billing information provided by the mobile communication exchange or the packet controller to store the combined information as single per-service billing information; and (d) transmitting the subscriber's billing information which includes the per-service billing information to a specific billing process system so as to bill the subscriber.

In still further another aspect of the present invention, a device for generating billing information for each data service based on an analysis of packet data transmitted between a subscriber and a service server when the subscriber uses a wireless data service of a specific service server through a mobile communication network, comprises: a packet analyzer for receiving user packet data transmitted between one of a mobile communication exchange and a packet controller and the service server, finding service information used by the subscriber through an analysis of the received user packet data, and outputting the service information as first billing information, the user packet data being reproduced by a packet repeater through a port mirroring method, the packet repeater repeating the packet data transmitted between one of the mobile communication exchange and the packet controller and the service server, and the mobile communication exchange and the packet controller providing a wireless data service to the subscriber; and a billing information storage unit for combining the first billing information output by the packet analyzer and second billing information provided by the mobile communication exchange or the packet controller to store the combined information as single per-service billing information, and transmitting the subscriber's billing information which includes the per-service billing information to a specific billing process system so as to bill the subscriber.

The packet analyzer uses the user packet data reproduced and received by the packet repeater to find information including a destination IP and a port number for each subscriber, and uses packet data used by the subscriber to find the subscriber's service usage information.

The packet repeater is a switching hub for transmitting packets to an appropriate port based on a packet address.

The packet repeater is a router for connecting separated networks that use the same transmission protocol.

In still further another aspect of the present invention, a method for generating billing information for each data service based on an analysis of packet data transmitted between a subscriber and a service server when the subscriber uses a wireless data service of a specific service server through a mobile communication network, comprises: (a) receiving user packet data transmitted between one of a mobile communication exchange and a packet controller and the service server, finding service information used by the subscriber through an analysis of the received user packet data, and outputting the service information as first billing information, the user packet data being reproduced by a packet repeater through a port mirroring method, the packet repeater repeating the packet data transmitted between one of the mobile communication exchange and the packet controller and the service server, and the mobile communication exchange and the packet controller providing a wireless data service to the subscriber; (b) combining the first billing information output in (a) and second billing information provided by the mobile communication exchange or the packet controller to store the combined information as single per-service billing information; and (c) transmitting the subscriber's billing information which includes the per-service billing information to a specific billing process system so as to bill the subscriber.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
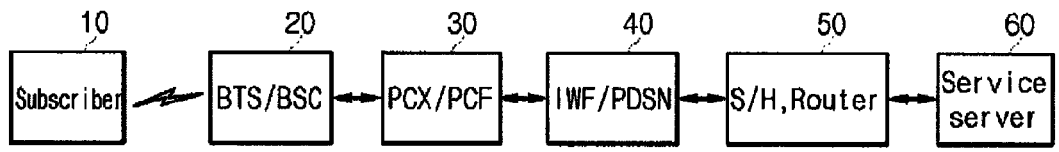
FIG. 1 shows a conventional system configuration diagram for providing a wireless data service.
Figure 2:
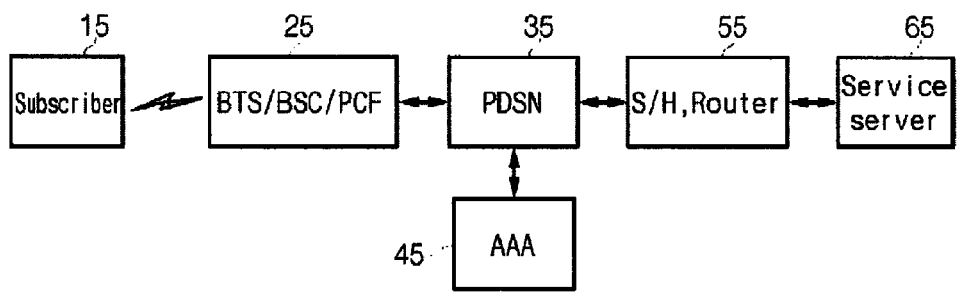
FIG. 2 shows a conventional system configuration diagram for providing a wireless data service.
Figure 3:
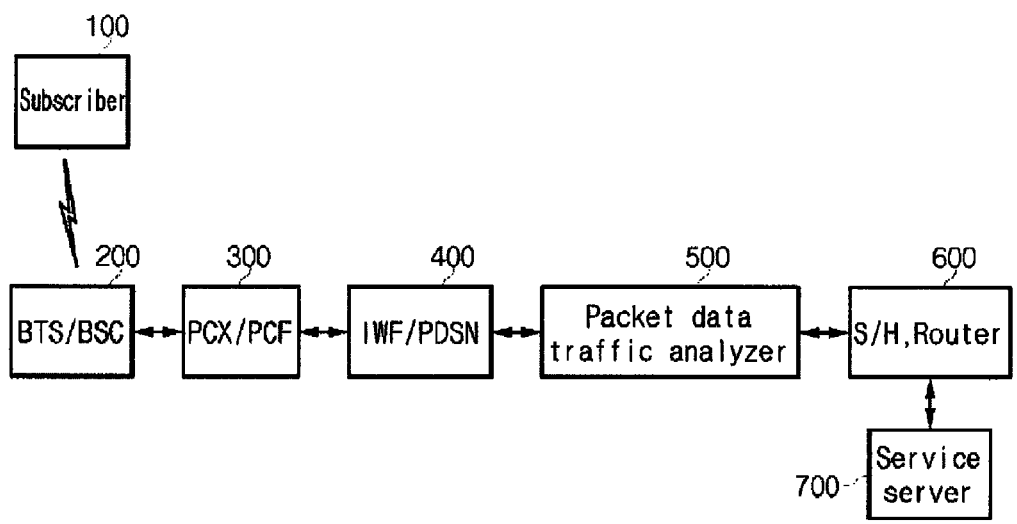
FIG. 3 shows a system configuration diagram on a mobile communication network to which a packet data traffic analyzer is used according to a first preferred embodiment of the present invention.

FIG. 3 shows a system configuration diagram on a mobile communication network to which a packet data traffic analyzer is used according to a first preferred embodiment of the present invention.

As shown, the system comprises a BTS/BSC 200, a PCX/PCF 300, an IWF/PDSN 400, a packet data traffic analyzer 500, and an S/H and router 600.

The BTS/BSC 200 guarantees mobility of a subscriber 100, and it is a wireless network for performing a handoff operation and a wireless support and management operation. The BTS is a network terminal for processing baseband signals, converting wired and wireless signals, and transmitting and receiving wireless signals to be connected to the subscriber 100, and the BSC is provided between the BTS and the PCX/PCF 300 to manage and control base stations.

The PCX 300 is a mobile communication exchange for connecting the subscriber 100 to the IWF/PDSN 300 when the subscriber 100 wirelessly accessed through the BTS/BSC 200 requests a wireless data service, and the PCF 300 is a packet controller.

The IWF/PDSN 400 is a network linker for connecting the PCX/PCF 300 to a data communication network including the Internet, wherein the IWF corresponds to a 2G IS-95A/B network case, and the PDSN corresponds to a cdma2000-1x network case.

The S/H 600 is a hub connected between the IWF/PDSN 400 and a service server 700, for transmitting packets to an appropriate port based on a packet address, and the router 600 connects separated networks that use the same transmission protocol.

The packet data traffic analyzer 500 is accessed between the IWF/PDSN 400 and the S/H and router 600, receives IP packet data transmitted therebetween, analyzes the IP packet data, and provides various statistical data.

Figure 4:
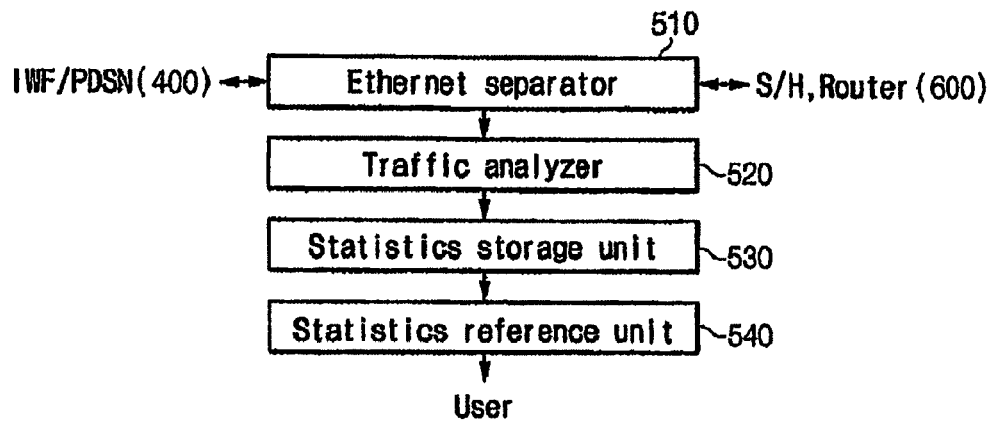
FIG. 4 shows a detailed block diagram of the packet data traffic analyzer shown in FIG. 3.

FIG. 4 shows a detailed block diagram of the packet data traffic analyzer 500 shown in FIG. 3.

As shown, the packet data traffic analyzer 500 comprises an Ethernet separator 510, a traffic analyzer 520, a statistics storage unit 530, and a statistics reference unit 540.

The Ethernet separator 510 is accessed between the IWF/PDSN 400 and the S/H and router 600, and separately receives user IP packet data as Tx (transmit) and Rx (receive) data.

Figure 5:
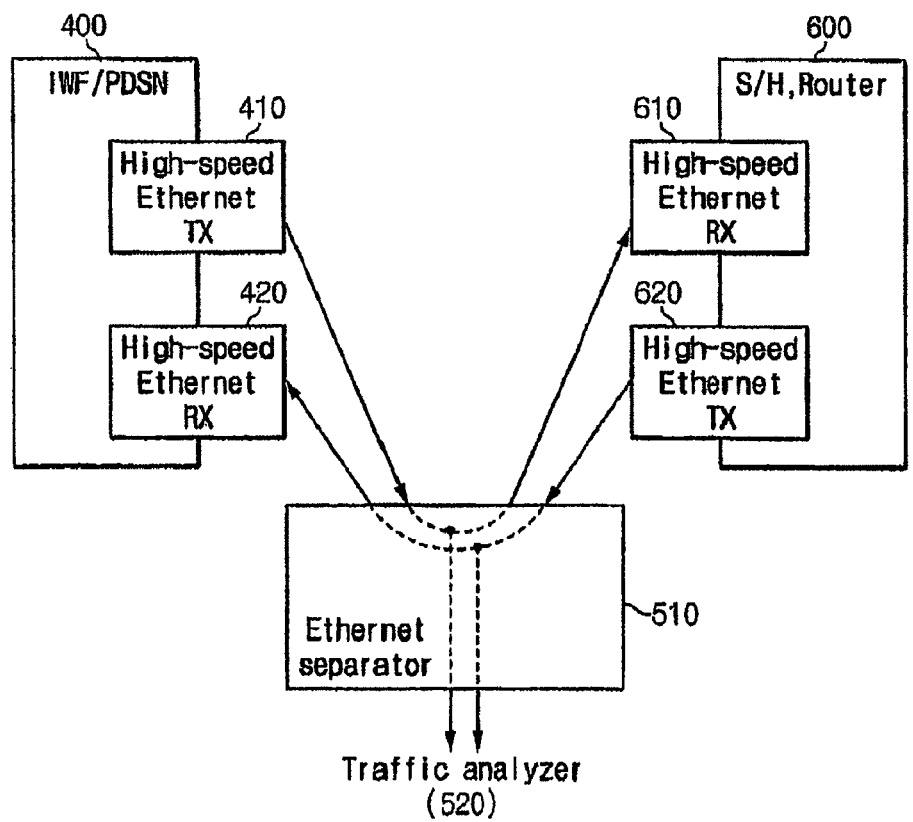
FIG. 5 shows an access by an Ethernet separator shown in FIG. 3.

Referring to FIG. 5, the Ethernet separator 510 is accessed to a cable connected from an Ethernet Tx port 410 of the IWF/PDSN 400 to an Ethernet Rx port 610 of the S/H and router 600, and receives packet data upward directing to the service server 700 from the subscriber 100, and accessed to a cable connected from an Ethernet Tx port 620 of the S/H and router 600 to an Ethernet Rx port 420 of the IWF/PDSN 400, and receives packet data downward directing to the subscriber 100 from the service server 700.

Figure 6:
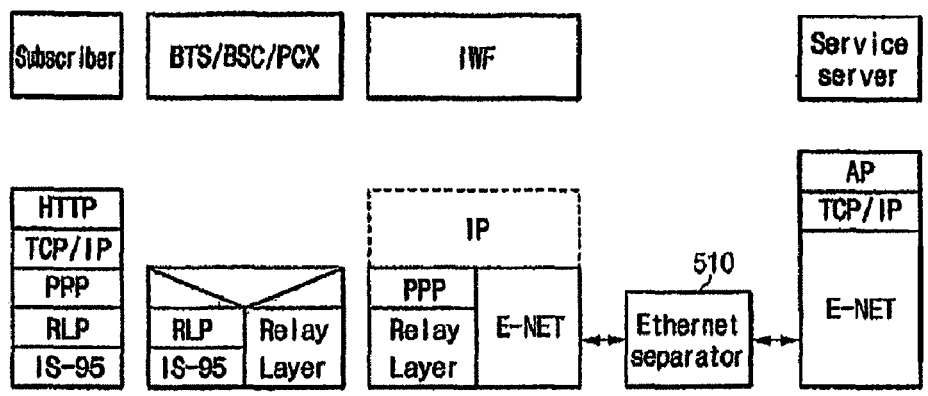
FIG. 6 shows a protocol structure in an IS-95A/B network according to a first preferred embodiment of the present invention.

As shown in FIG. 6, the Ethernet separator 510 in the protocol structure of the 2G IS-95A/B network, is provided between an E-net (Ethernet) which is a physical layer of the IWF 400 and an E-net (Ethernet) which is a physical layer of the service server 700, separates an IP network provided between the IWF 400 and the service server 700 from the physical layer, and receives the packet data transmitted and received between the subscriber 100 and the service server 700.

Figure 7:
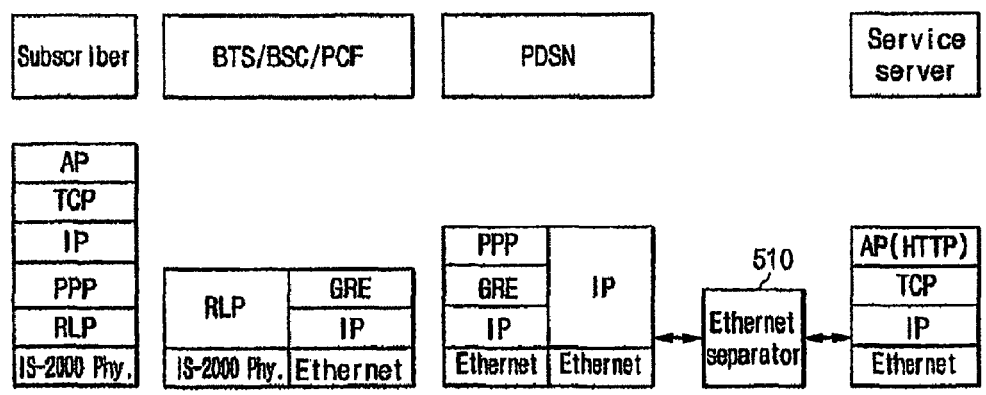
FIG. 7 shows a protocol structure in a cdma2000-1x network according to a first preferred embodiment of the present invention.

As shown in FIG. 7, the Ethernet separator 510 in the protocol structure of the 3G cdma2000-1x network, is provided between an E-net (Ethernet) which is a physical layer of the PDSN 400 and an E-net which is a physical layer of the service server 700, separates an IP network provided between the PDSN 400 and the service server 700 from the physical layer, and receives the packet data transmitted and received between the subscriber 100 and the service server 700.

The traffic analyzer 520 receives the user IP packet data through the Ethernet separator 510 as Tx and Rx data, and analyzes them.

Figure 8:
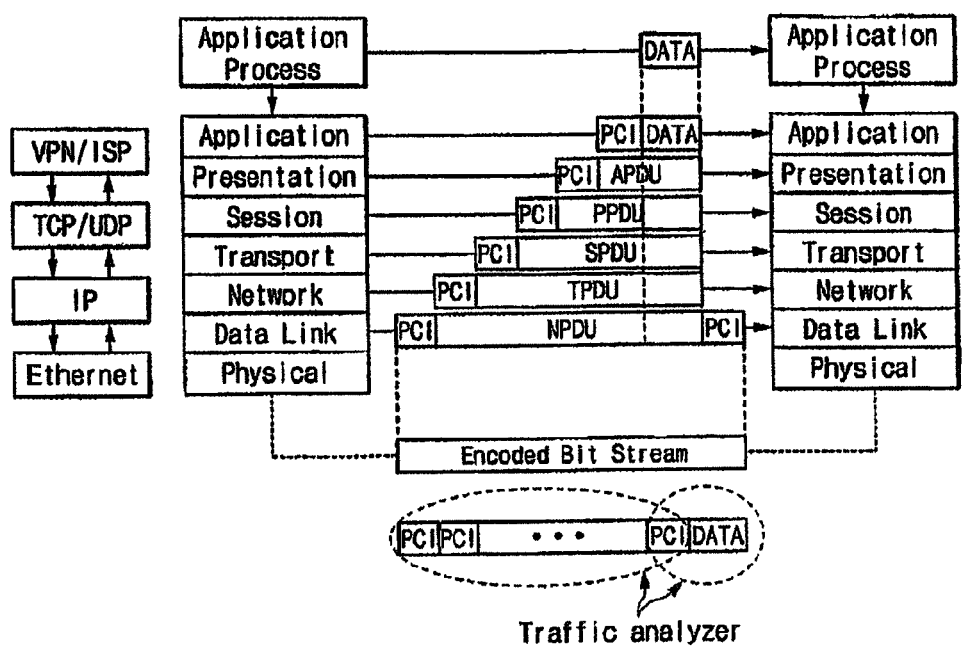
FIG. 8 shows a packet data traffic analysis concept for each layer of an OSI model by a traffic analysis unit shown in FIG. 3.

Referring to FIG. 8, the traffic analyzer 520 receives encoded bit streams through the Ethernet separator 510, and analyzes packet data traffic for each layer of the OSI (open systems interconnection) model.

For example, since the encoded bit streams include a plurality of PCI (protocol control information) including control information of each layer, and data transmitted between the subscriber 100 and the service server 700, the traffic analyzer 520 eliminates each PCI from the corresponding encoded bit stream, and analyzes the packet data traffic in the respective layers including a data link layer, a network layer, a transport layer, a session layer, a presentation layer, and an application layer. That is, a DLPDU which is a PDU (protocol data unit) of a data link layer is found by eliminating the PCI of a physical layer from the encoded bit stream, and hence, the packet data traffic in the data link layer is analyzed. An NPDU which is a PDU of a network layer is found by eliminating PCI of the data link layer from the DLPDU, a TPDU which is a PDU of a transport layer is found by eliminating PCI of the network layer from the NPDU, an SPDU which is a PDU of a session layer is found by eliminating PCI of the transport layer from the TPDU, a PPDU which is a PDU of a presentation layer is found by eliminating PCI of the session layer from the SPDU, an APDU which is a PDU of an application layer is found by eliminating PCI of the presentation layer from the PPDU, and final transmission data are found by eliminating PCI of the application layer from the APDU. Since PCI included in the DLPDU, the NPDU, the TPDU, the SPDU, the PPDU, and the APDU is separately defined for each layer, and the PCI includes error control information, flow control information, and address information, the traffic analyzer 520 analyzes the packet data traffic of each layer transmitted between the subscriber 100 and the service server 700 through the respective PDUs.

Figure 9:
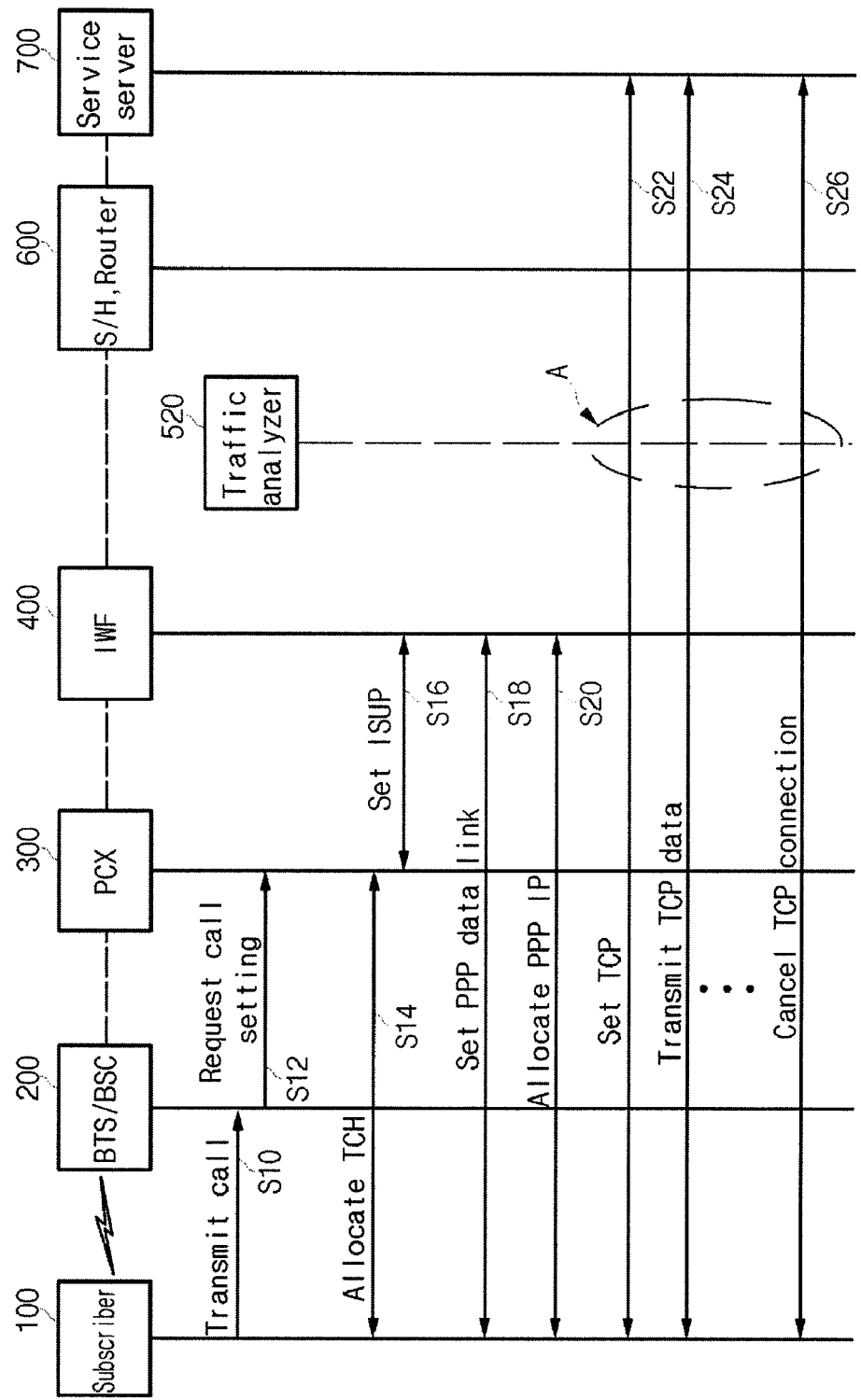
FIG. 9 shows a call flow in an IS-95A/B network according to a first preferred embodiment of the present invention.
Figure 10:
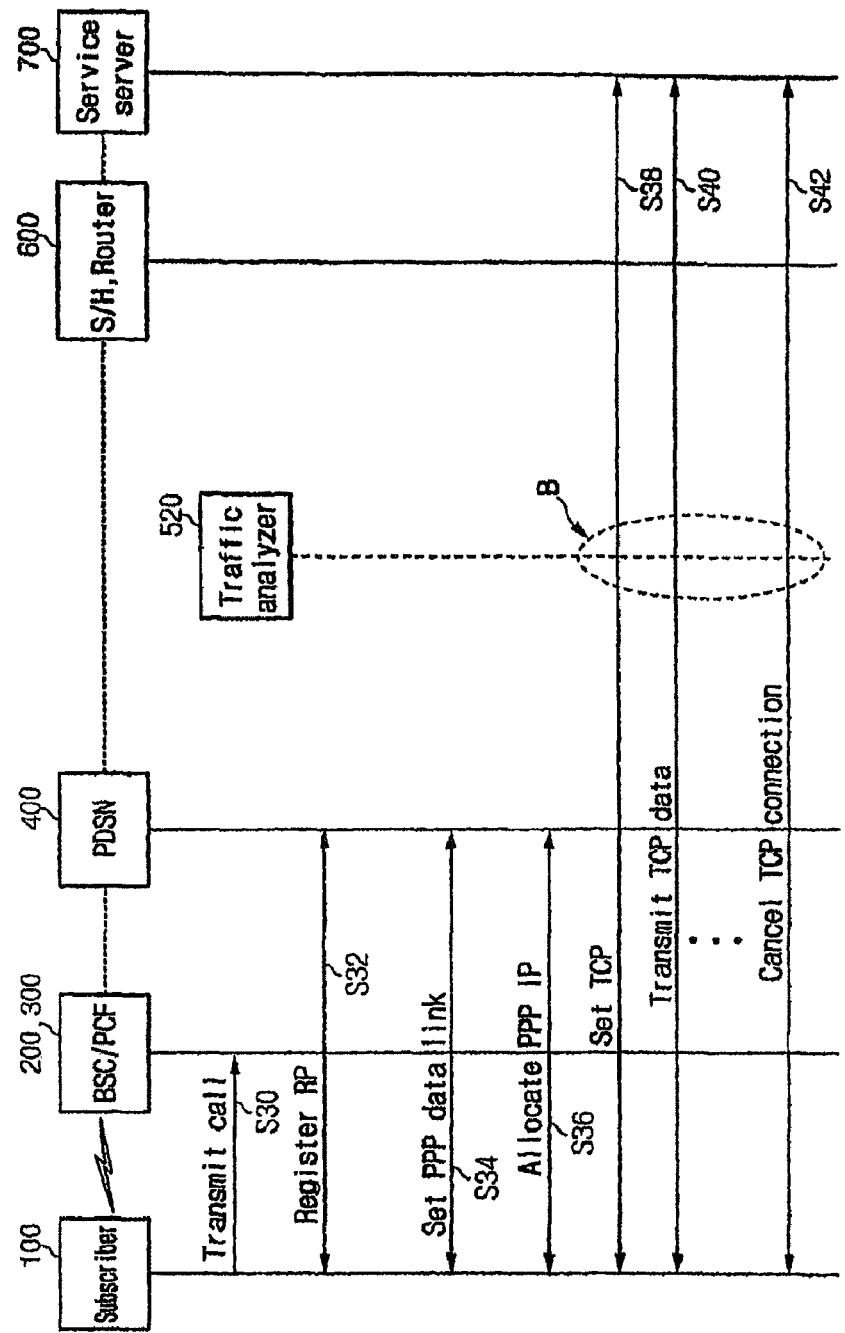
FIG. 10 shows a call flow in a cdma2000-1x network according to a first preferred embodiment of the present invention.

Referring to FIGS. 9 and 10, the traffic analyzer 520 analyzes the traffic through a call process flow in the 2G and 3G networks to find various statistical data.

FIG. 9 is a call process flow applicable to the 2G IS-95A/B.

When a subscriber 100 attempts a wireless call transmission to the BTS/BSC 200 for wireless data communication with the service server 700 in step S10, the BTS/BSC 200 requests a corresponding call setting from the PCX 300 in step S12.

The PCX 300 allocates a traffic channel (TCH) to the subscriber 100 in step S14 according to the wireless call setting request provided from the subscriber 100, the PCX 300 requests an ISUP (ISDN user part) setting from the IWF 400 when the allocation of the TCH is finished, and the ISUP setting between the PCX 300 and the IWF 400 is finished when the IWF 400 responds to the request of ISUP setting in step S16.

The subscriber 100 requests a PPP data link setting from the IWF 400 when the ISUP setting between the PCX 300 and the IWF 400 is finished, and a PPP data link between the subscriber 100 and the IWF 400 is set in step S18 when the IWF 400 responds to the above-noted request.

The subscriber 100 requests a PPP IP allocation from the IWF 400, and the IWF 400 allocates a PPP IP to the subscriber 100 in response to the request in step S20.

When the PPP setting between the subscriber 100 and the IWF 400 is finished, a TCP connection request between the subscriber 100 and the service server 700 and a setting operation are performed through the S/H and router 600 in step S22, and accordingly, the subscriber 100 and the service server 700 transmit the TCP data in step S24.

The TCP connection is disconnected in step S26 when the call is finished during the TCP data transmission.

As to the 2G call process flow, the traffic analyzer 520 is provided between the IWF 400 and the S/H and router 600, and it performs TCP setting, receives TCP data transmission traffic, and analyzes the TCP data transmission traffic indicated by a dotted circle A of FIG. 9 to find successful access rates for the service server 700, and access time, access failure factors, data usage statistics, and menu hit statistics.

In the same manner, FIG. 10 shows a call process flow applied to the 3G cdma2000-1x network.

When a subscriber 100 attempts a call transmission for setting a wireless call to the BSC/PCF 200 and 300 for wireless data communication with the service server 700 in step S30, and a corresponding wireless call is established, the subscriber 100 requests an RP registration from the PDSN 400, and the RP registration between the subscriber 100 and the PDSN 400 is finished in step S32 when the PDSN 400 replies to the request.

The subscriber 100 requests a PPP data link setting from the PDSN 400 when the RP registration between the subscriber 100 and the PDSN 400 is finished, and a PPP data link between the subscriber 100 and the PDSN 400 is established when the PDSN 400 replies to the request in step S34. The subscriber 100 requests a PPP IP allocation from the PDSN 400, and the PDSN 400 allocates a PPP IP to the subscriber 100 in response to the request in step S36.

When the PPP setting between the subscriber 100 and the PDSN 400 is finished, a TCP connection request between the subscriber 100 and the service server 700 and a setting operation are performed through the S/H and router 600 in step S38, and the subscriber 100 and the service server 700 transmit TCP data in step S40. The TCP connection is cancelled when one person has hung up the phone during the transmission of the TCP data in step S42.

In the 3G call process flow, the traffic analyzer 520 is provided between the PDSN 400 and the S/H and router 600, performs TCP setting and receives TCP data transmission traffic depicted by a dotted circle of B in FIG. 10, analyzes the TCP data transmission traffic, and finds successful access rates for the service server 700, and access time, access failure factors, data usage statistics, and menu hit statistics.

The traffic analyzer 520 analyzes the traffic through various data as follows that is found as described above.

1) Tx/Rx data usage statistics of an OSI 7 layer (a physical layer or an application layer)

2) Tx/Rx data usage statistics obtained by applying a subnet mask to a source IP/destination IP 3) Tx/Rx data usage statistics for each device by an IWF/PDSN IP pool 4) A11 access/PDSN PPP access statistics for each base station classified by service options 5) Application statistics by a TCP/UDP port number The statistics storage unit 530 stores result data analyzed by the traffic analyzer 520 through the packet data received through the Ethernet separator 510, and comprises a database for storing various data including analysis data, and a database manager for retrieving corresponding data from the database according to an external data retrieval request and providing retrieval results.

The statistics reference unit 540 includes a GUI (graphical user interface) which is an interface with a user, and retrieves various data stored in the statistics storage unit 530, and provides statistical information desired by the user.

The user obtains various real-time statistics data analyzed through the direct traffic on the IP network through the GUI of the statistics reference unit 540. The real-time statistics data include statistics on communication amounts of Rx, Tx, and Rx+Tx data, access trials for each layer, a number of success times, a number of failure times, and current states, and further include usage statistics for each IP on each application, successful access rate statistics for each service, statistics such as response times, and successful rate statistics on a PPP session for each base station.

By separately analyzing the traffic on the physical layer in the IP network by using the Ethernet separator 510 as described above, much statistical information is obtained compared to the analysis by the data traffic statistics provided by the conventional IWF and the PDSN, and more effective management of the IP network is possible.

Figure 11:
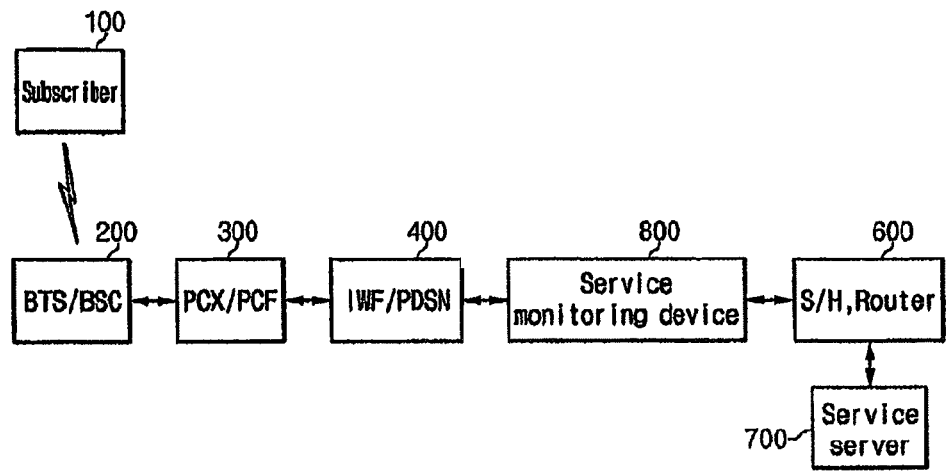
FIG. 11 shows a system configuration diagram of a mobile communication network in which a service monitoring device is used by a packet data traffic analyzer according to a second preferred embodiment of the present invention.

FIG. 11 shows a system configuration diagram of a mobile communication network to which a service monitoring device is used by a packet data traffic analysis according to a second preferred embodiment of the present invention.

As shown, the system of a mobile communication network to which a service monitoring device is used by a packet data traffic analysis comprises a BTS/BSC 200, a PCX/PCF 300, an IWF/PDSN 400, an S/H and router 600, and a service monitoring device 800. The BTS/BSC 200, the PCX/PCF 300, the IWF/PDSN 400, and the S/H and router 600 use the same reference numerals as the first preferred embodiment with reference to FIG. 3 since they have the same functions. In addition, the service monitoring device 800 will be described since the operations and functions of the BTS/BSC 200, the PCX/PCF 300, the IWF/PDSN 400, and the S/H and router 600 have been described referring to FIGS. 3 to 10.

The service monitoring device 800 is accessed between the IWF/PDSN 400 and the S/N and router 600, and it receives and analyzes the IP packet data transmitted between the IWF/PDSN 400 and the S/N and router 600 and generates various statistical data, and also refers to the statistical data periodically or in real-time to provide various service states to the mobile communication network management service provider as visual and audible information.

Figure 12:
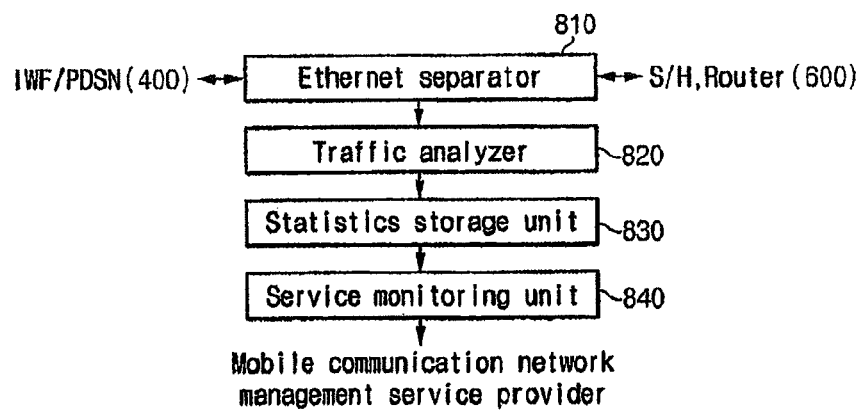
FIG. 12 shows a detailed block diagram of a service monitoring device shown in FIG. 11.

FIG. 12 shows a detailed block diagram of a service monitoring device shown in FIG. 11.

As shown, the service monitoring device 800 comprises an Ethernet separator 810, a traffic analyzer 820, a statistics storage unit 830, and a service monitoring unit 840. The Ethernet separator 810, the traffic analyzer 820, and the statistics storage unit 830 will be briefly described since they have the same functions as those of the Ethernet separator 510, the traffic analyzer 520, and the statistics storage unit 530.

The Ethernet separator 810 is directly accessed between the IWF/PDSN 400 and the S/H and router 600, and it receives user IP packet data as separate Tx and Rx data. In detail, the Ethernet separator 810 is accessed to a cable connected between the IWF/PDSN 400 and the S/H and router 600, and separates the physical layer to receive user packet data transmitted between the subscriber 100 and the service server 700.

The traffic analyzer 820 separates the user IP packet data received through the Ethernet separator 810 into Tx and Rx data, analyzes them, catches call process flows in the 2G and 3G networks through the analysis, and finds various statistics caused by the traffic analysis.

The traffic analyzer 820 finds various statistic data in the first preferred embodiment, and needs statistic information for monitoring the service in the second preferred embodiment, and the statistic information includes:

1) Statistics separated for each service option (a number of trials, and a number of success events)

2) Statistics by TCP port numbers (a number of trials, and a number of success events)

Next, the statistics storage unit 830 stores result data analyzed by the traffic analyzer 820 through the packet data received through the Ethernet separator 810, and comprises a database for storing various data including analysis data, and a database manager for retrieving corresponding data from the database according to an external data retrieval request, and providing the data.

The service monitoring unit 840 refers to statistical data including a number of trials and a number of success events separated by each service option, and a number of service trials and a number of success events by TCP port numbers periodically or in real-time according to a request by the mobile communication network management service provider, and provides normal states of the respective services to the mobile communication network management service provider as visual and audible information. Therefore, the mobile communication network management service provider uses the Ethernet separator 810 to separately analyze the traffic of the physical layer in the IP network, thereby allowing service monitoring.

Figure 13:
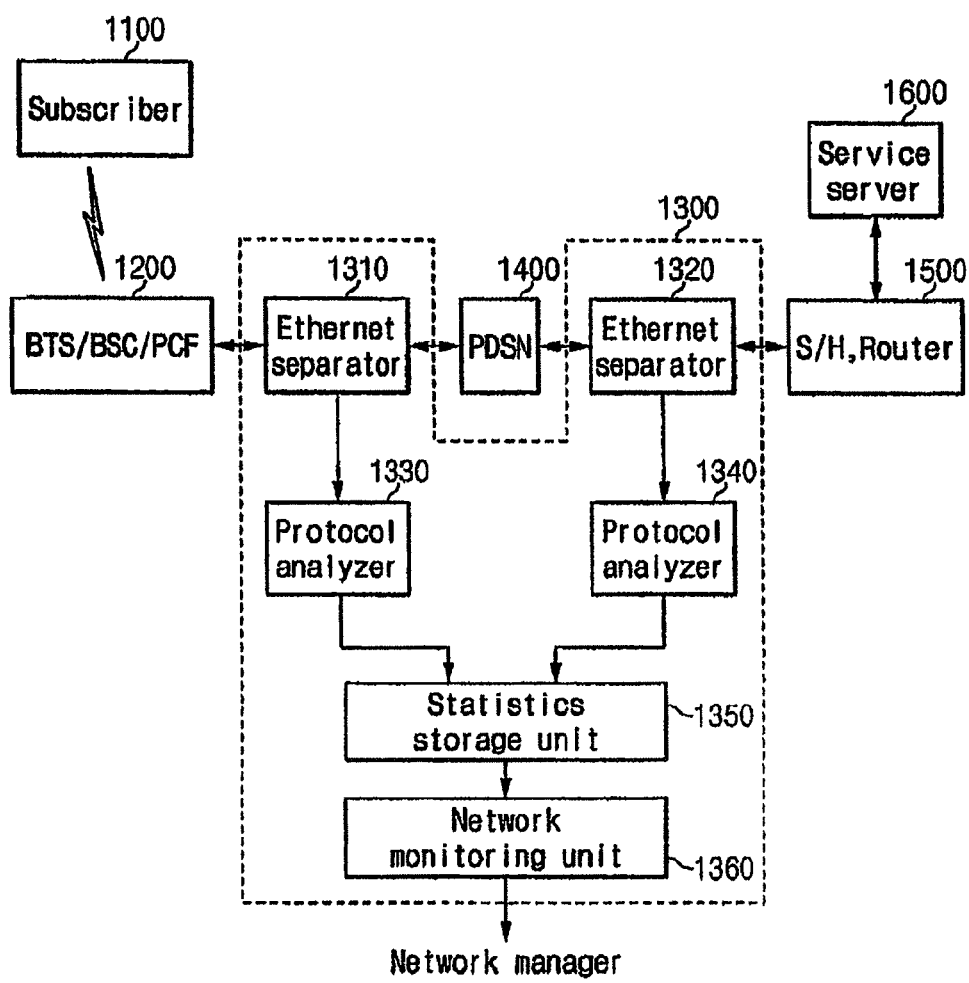
FIG. 13 shows a system configuration diagram of a mobile communication network to which a network monitoring device is used based on a protocol analysis according to a third preferred embodiment of the present invention.

FIG. 13 shows a system configuration diagram of a mobile communication network to which a network monitoring device is used based on a protocol analysis according to a third preferred embodiment of the present invention.

As shown, the system of a mobile communication network to which a network monitoring device is used based on a protocol analysis comprises a BTS/BSC/PCF 1200, a network monitoring device 1300, a PDSN 1400, and an S/H and router 1500. For ease of description, no descriptions of the BTS/BSC 1200, the PCF 1200, the PDSN 1400, and the S/H and router 1500 will be provided since they correspond to the descriptions provided with reference to FIG. 3 in the first preferred embodiment.

The network monitoring device 1300 is accessed between the PCF 1200 and the PDSN 1400 and between the PDSN 1400 and the S/H and router 1500, and it receives and analyzes the IP packet data transmitted between the PCF 1200 and the PDSN 1400 and between the PDSN 1400 and the S/H and router 1500, generates various statistics, periodically refers to the statistics to generate information on the states of the network, and provides the information in the visual and audible format to the mobile communication network management service provider.

The network monitoring device 1300 comprises Ethernet separators 1310 and 1320, protocol analyzers 1330 and 1340, a statistics storage unit 1350, and a network monitoring unit 1360.

The Ethernet separator 1310 directly accessed between the PCF 1200 and the PDSN 1400 separates received user IP packet data into Tx and Rx data, and the Ethernet separator 1320 directly accessed between the PDSN 1400 and the S/H and router 1500 separates received user IP packet data into Tx and Rx data.

Figure 14:
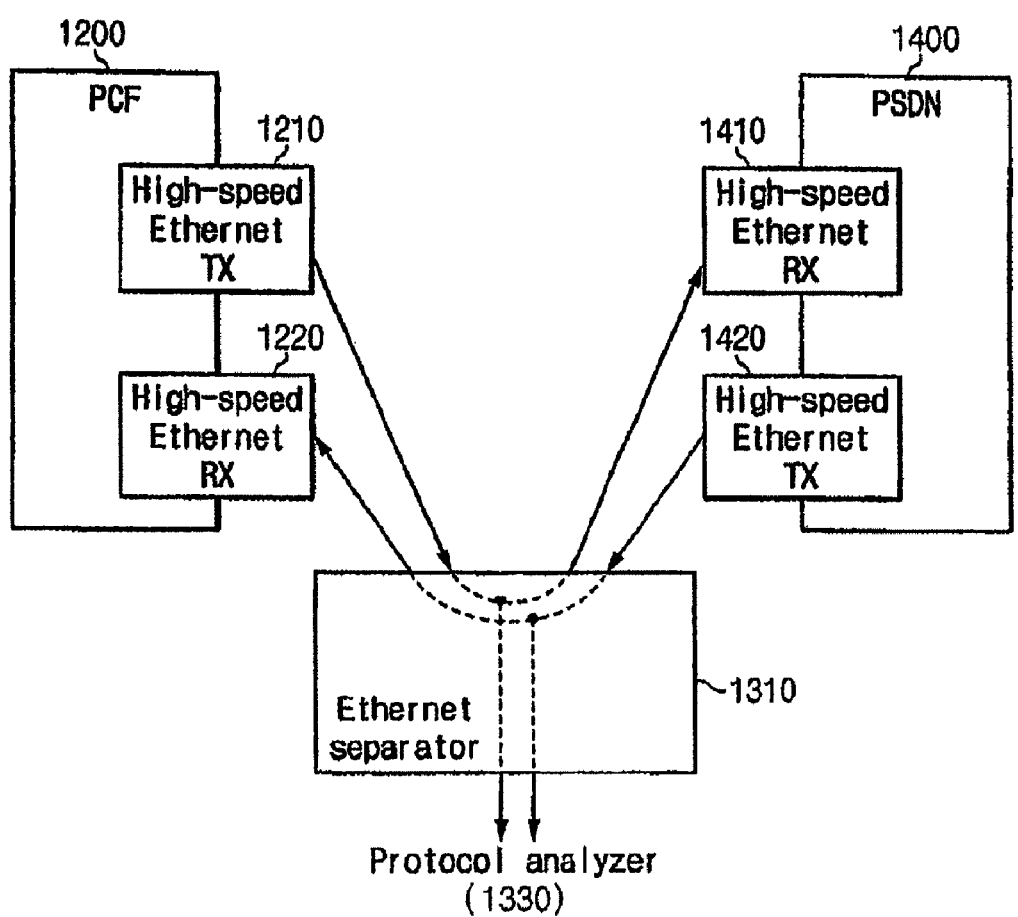
FIG. 14 shows an access by an Ethernet separator shown in FIG. 13.

Referring to FIG. 14, the Ethernet separator 1310 is accessed to a cable connected from an Ethernet Tx port 1210 of the PCF 1200 to an Ethernet Rx port 1410 of the PDSN

1400, and receives packet data upwards provided to the service server 1700 from the subscriber 1100, and is accessed to a cable connected from an Ethernet Tx port 1420 of the PDSN 1400 to an Ethernet Rx port 1220 of the PCF 1200, and receives packet data downwards provided from the service server 1700 to the subscriber 1100.

Figure 15:
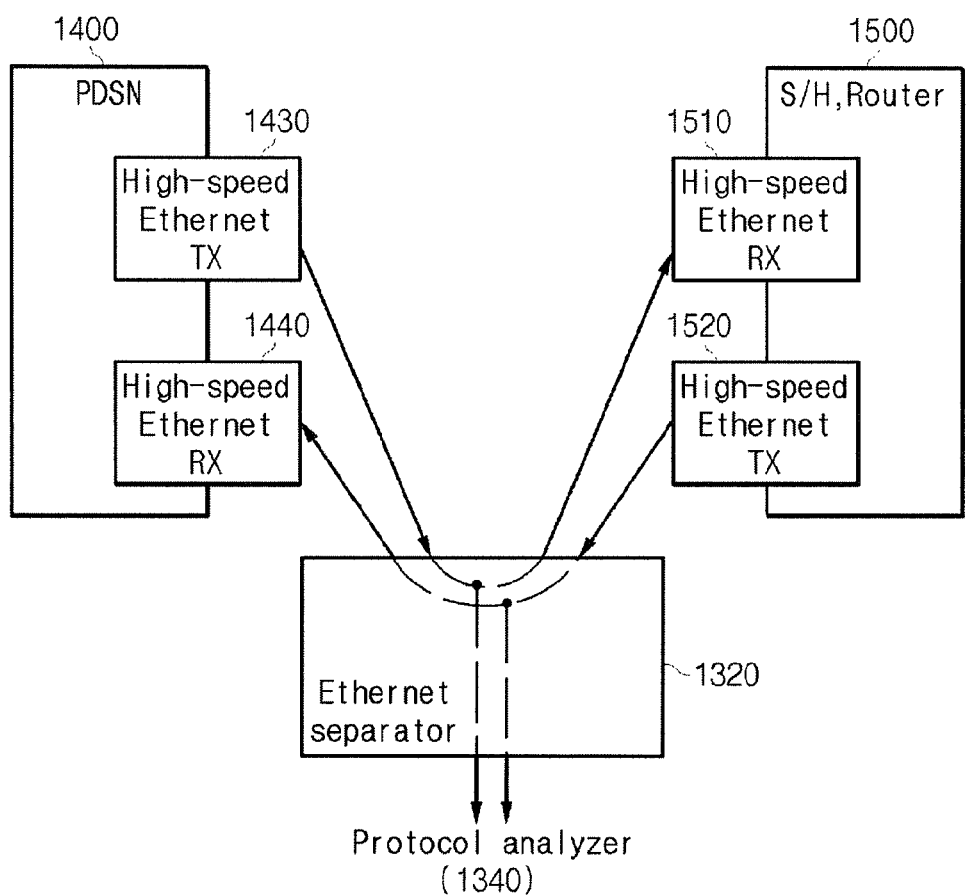
FIG. 15 shows an access by another Ethernet separator shown in FIG. 13.

Referring to FIG. 15, the Ethernet separator 1320 is accessed to a cable connected from an Ethernet Tx port 1430 of the PDSN 1400 to an Ethernet Rx port 1510 of the S/H and router 1500, and receives packet data upwards provided to the service server 1700 from the subscriber 1100, and is accessed to a cable connected from an Ethernet Tx port 1520 of the S/H and router 1600 to an Ethernet Rx port 1440 of the PDSN 1400, and receives packet data downwards provided from the service server 1700 to the subscriber 1100.

Figure 16:
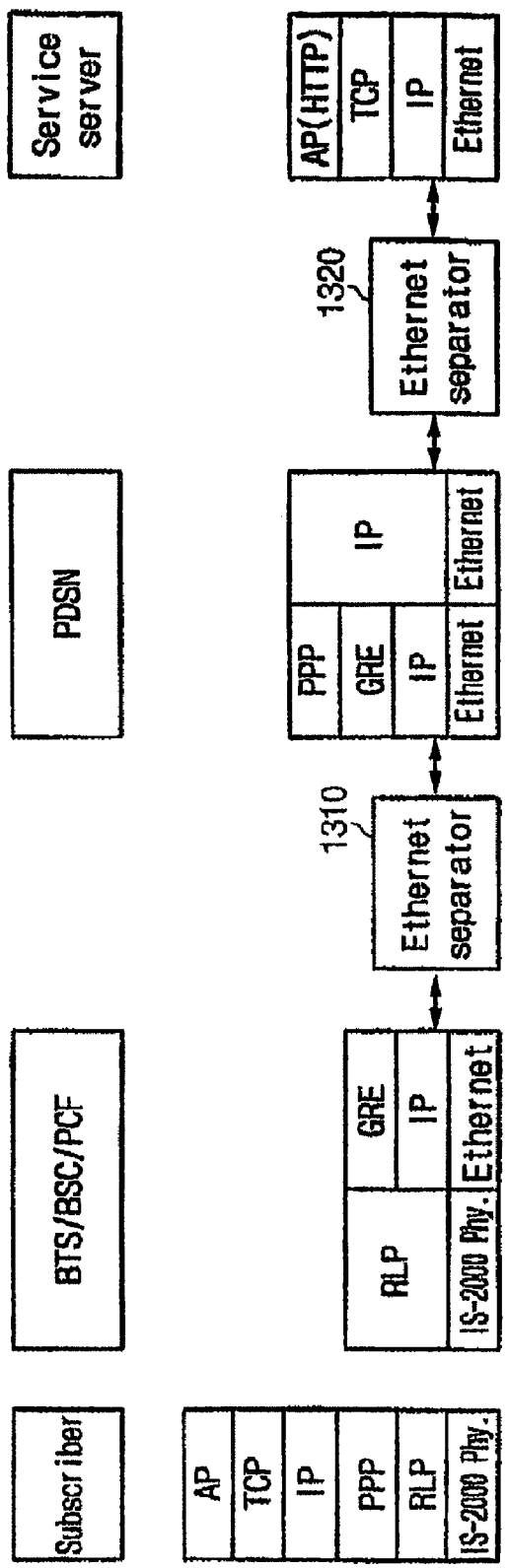
FIG. 16 shows a protocol configuration in a cdma2000-1x network according to a third preferred embodiment of the present invention.

As shown in FIG. 16, in the protocol structure of the 3G cdma2000-1x, the Ethernet separator 1310 is provided between an Ethernet which is a physical layer of the PCF 1200 and an Ethernet which is a physical layer of the PDSN 1400 to separate the IP network between the PCF 1200 and the PDSN 1400 from the physical layer, and receives the packet data transmitted and received between the PCF 1200 and the PDSN 1400. The Ethernet separator 1320 is provided between an Ethernet which is a physical layer of the PDSN 1400 and an Ethernet which is a physical layer of the service server 1600 to separate the IP network between the PDSN 1400 and the service server 1600 from the physical layer, and receives the packet data transmitted and received between the PDSN 1400 and the service server 1600.

The protocol analyzers 1330 and 1340 separate the user IP packet data received through the Ethernet separators 1310 and 1320 into Tx and Rx data, and analyze the A11 and RADIUS protocol data statistics relating to the wireless data communication, in particular, the wireless Internet service for the respective Tx and Rx data.

Figure 17:
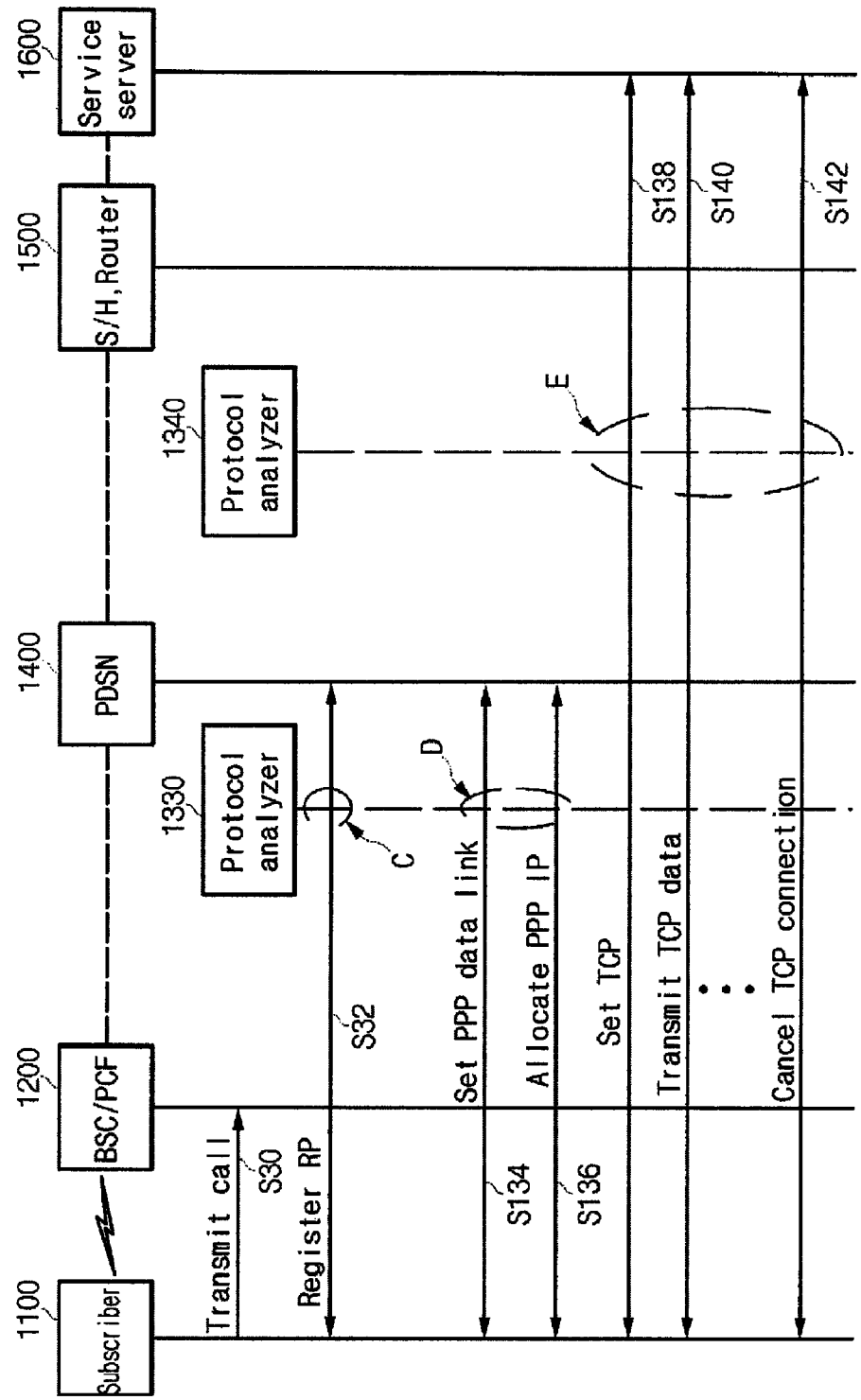
FIG. 17 shows a call flow in a cdma2000-1x network according to a third preferred embodiment of the present invention.

Referring to FIG. 17, the protocol analyzers 1330 and 1340 analyze protocols through the call process flow in the IP network to find various statistical data.

FIG. 17 shows a call process flow applied to the mobile communication network. The processes S130 to S142 for establishing a TCP between the subscriber 1 100 and the service server 1600 to transmit TCP data, and canceling the TCP connection, will not be described for ease of description since they correspond to the processes S30 to S42 described with reference to FIG. 9 in the first preferred embodiment of the present invention.

In the call process flow in the mobile communication network as shown in FIG. 17, the protocol analyzer 1330 is provided between the PCF 1200 and the PDSN 1400, and it performs an RP registration indicated by a dotted circle C', receives a subscriber authentication protocol to analyze the subscriber authentication protocol, finds authentication successful rates, authentication execution times, and authentication failure factors, sets a PPP data link and receives a PPP IP allocation protocol indicated by a dotted circle D to analyze the PPP IP allocation protocol, and finds session successful rates, session failure factors, and session execution times. The protocol analyzer 1340 is provided between the PDSN 1400 and the S/H router 1500, and it sets a TCP and receives a TCP data transmission protocol indicated by a dotted circle E to analyzes the TCP data transmission protocol, and finds access successful rates to the service server 1600, access times, access failure factors, data usage statistics, and menu hit statistics.

As described, the protocol analyzers 1330 and 1340 analyze the subsequent contents based on the data found as described above to generate statistical information for monitoring the network.

1) A11 access statistics for each base station (a number of trials, and a number of success events)
2) A11 access statistics for each PDSN (a number of trials, and a number of success events)
3) Statistics for each A11 failure factor
4) PPP access statistics for each base station
5) PPP access statistics for each PDSN
6) RADIUS message statistics The statistics storage unit 1350 stores result data respectively analyzed by the protocol analyzers 1330 and 1340. The statistics storage unit 1350 comprises a database for storing various data including analysis data, and a database manager for retrieving corresponding data according to an external data retrieval request and providing the data.

The network monitoring unit 1360 periodically refers to various statistical data stored in the statistics storage unit 1350, and provides network normality states to the mobile communication network management service provider as visual and audible information. Therefore, the mobile communication network management service provider analyzes the protocol of the physical layer by using the Ethernet separators 1310 and 1320 in the IP network, thereby enabling monitoring of the whole network.

Figure 18:
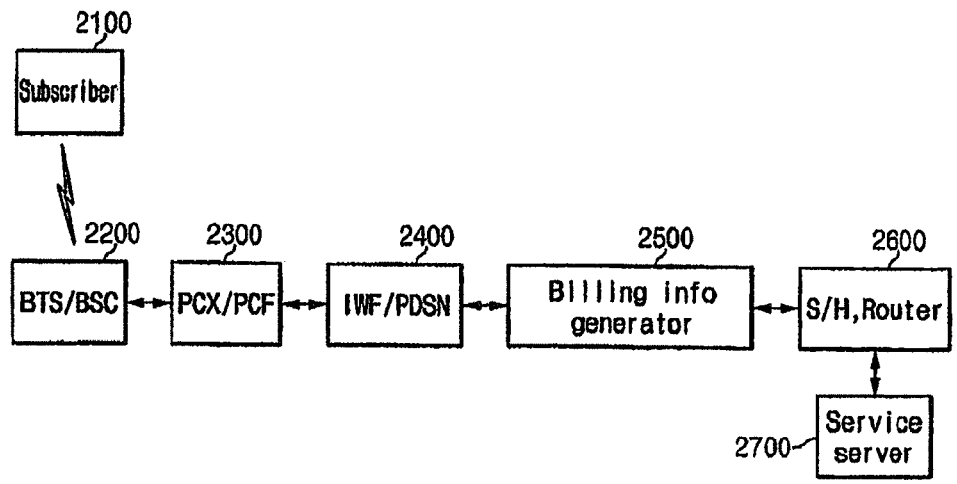
FIG. 18 shows a system configuration of a mobile communication network to which a billing information generator for each data service based on a packet data analysis is used according to a fourth preferred embodiment of the present invention.

FIG. 18 shows a system configuration of a mobile communication network to which a billing information generator for each data service based on a packet data analysis is used according to a fourth preferred embodiment of the present invention.

As shown, the system comprises a BTS/BSC 2200, a PCX/PCF 2300, an IWF/PDSN 2400, a billing information generator 2500, and an S/H and router 2600. No descriptions of the BTS/BSC 2200, the PCX/PCF 2300, the IWF/PDSN 2400, and the S/H and router 2600 will be provided since they correspond to those provided with reference to FIG. 3 in the first preferred embodiment.

The billing information generator 2500 is accessed between the IWF/PDSN 2400 and the S/H and router 2600, and generates per-service billing information by using user IP packet data transmitted between the IWF/PDSN 2400 and the S/H and router 2600, and billing information provided by the IWF/PDSN 400.

Figure 19:
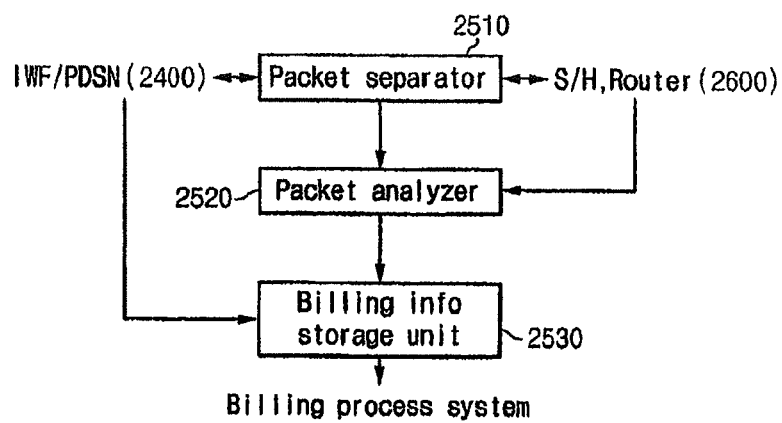
FIG. 19 shows a detailed block diagram of a billing information generator shown in FIG. 18.

FIG. 19 shows a detailed block diagram of the billing information generator 2500 shown in FIG. 18.

As shown, the billing information generator 2500 comprises a packet separator 2510, a packet analyzer 2520, and a billing information storage unit 2530.

The packet separator 2510 is directly accessed between the IWF/PDSN 2400 and the S/H and router 2600, and separates the received user IP packet data into Tx and Rx data.

Figure 20:
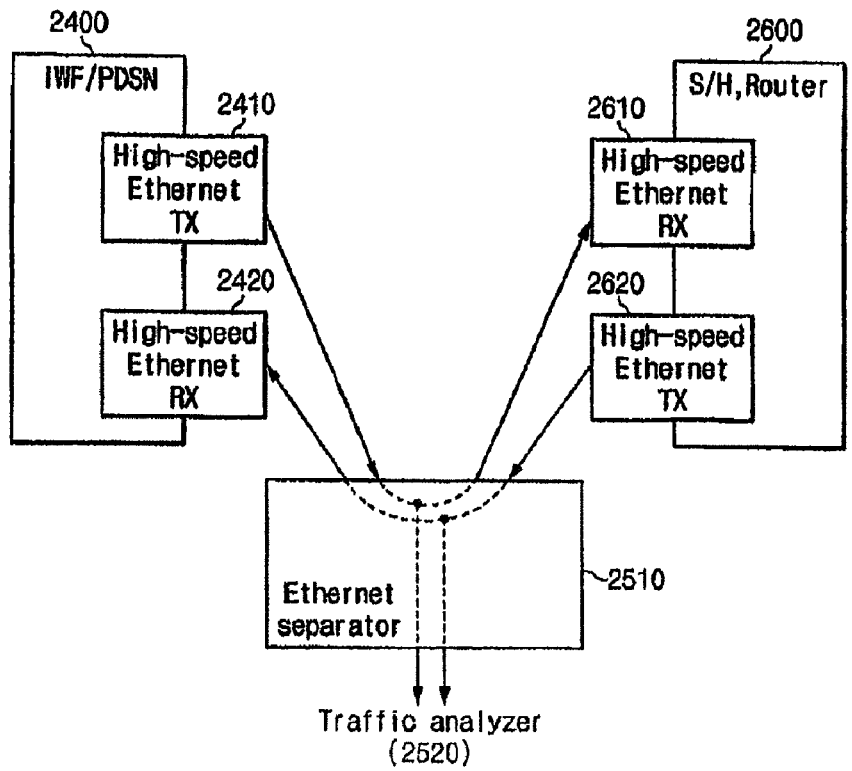
FIG. 20 shows an access by a packet separator shown in FIG. 18.

Referring to FIG. 20, the packet separator 2500 is accessed to a cable connected from an Ethernet Tx port 2410 of the IWF/PDSN 2400 to an Ethernet Rx port 2510 of the S/H and router 2600 to receive packet data provided upwards to the service server 2700 from the subscriber 2100, and is accessed to a cable connected from an Ethernet Tx port 2520 of the S/H and router 2600 to an Ethernet Rx port 2420 of the IWF/PDSN 2400 to receive packet data provided downwards to the subscriber 2100 from the service server 2700.

Figure 21:
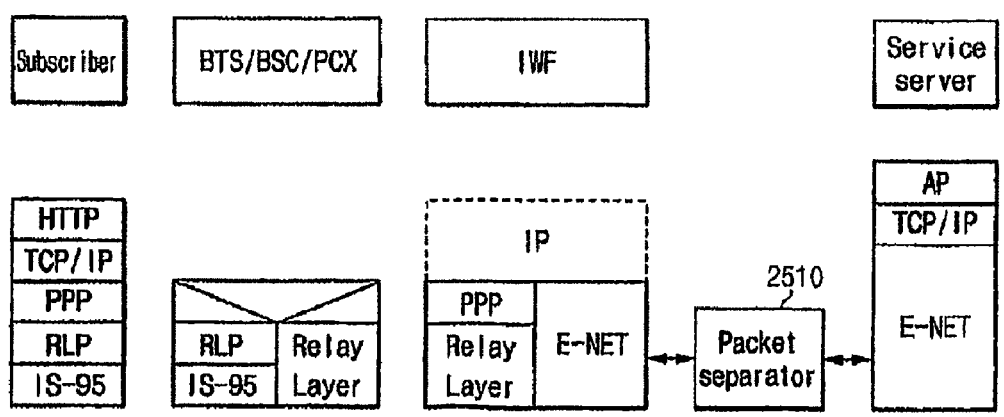
FIG. 21 shows a protocol structure in an IS-95A/B network according to a fourth preferred embodiment of the present invention.

As shown in FIG. 21, the packet separator 2510 in the 2G IS-95A/B network is provided between an Ethernet (E-NET) which is a physical layer of the IWF 2400 and an Ethernet (E-NET) which is a physical layer of the service server 2700, separates an IP network between the IWF 2400 and the service server 2700 from the physical layer, and receives packet data transmitted between the subscriber 2100 and the service server 2700.

Figure 22:
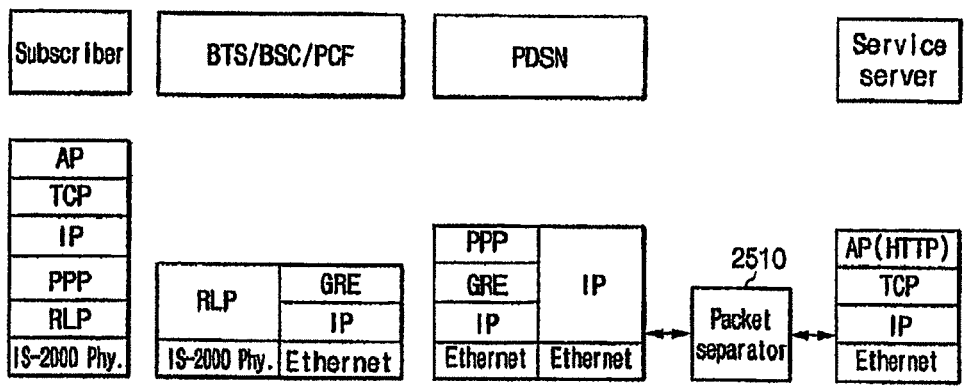
FIG. 22 shows a protocol structure in a cdma2000-1x network according to a fourth preferred embodiment of the present invention.

As shown in FIG. 22, the packet separator 2510 in the 3G cdma2000-1x network is provided between an Ethernet (E-NET) which is a physical layer of the PDSN 2400 and an Ethernet (E-NET) which is a physical layer of the service server 2700, separates an IP network between the PDSN 2400 and the service server 2700 from the physical layer, and receives packet data transmitted between the subscriber 2100 and the service server 2700.

The packet analyzer 2520 separates the received user packet data into Tx and Rx data through the packet separator 2510, or separates the received user packet data into Tx and Rx data from the IP network by using a port mirroring function provided by the S/H and router 2600. The port mirroring function provided by the S/H and router 2600 will not be described since it is known to a person skilled in the art. The packet analyzer 2520 analyzes the user packet data received from the packet separator 2510 or the S/H and router 2600, and uses information on the analyzed per-subscriber destination IP and port number, and packet data used by the subscriber 2100 to find service information used by the subscriber 2100.

Figure 23:
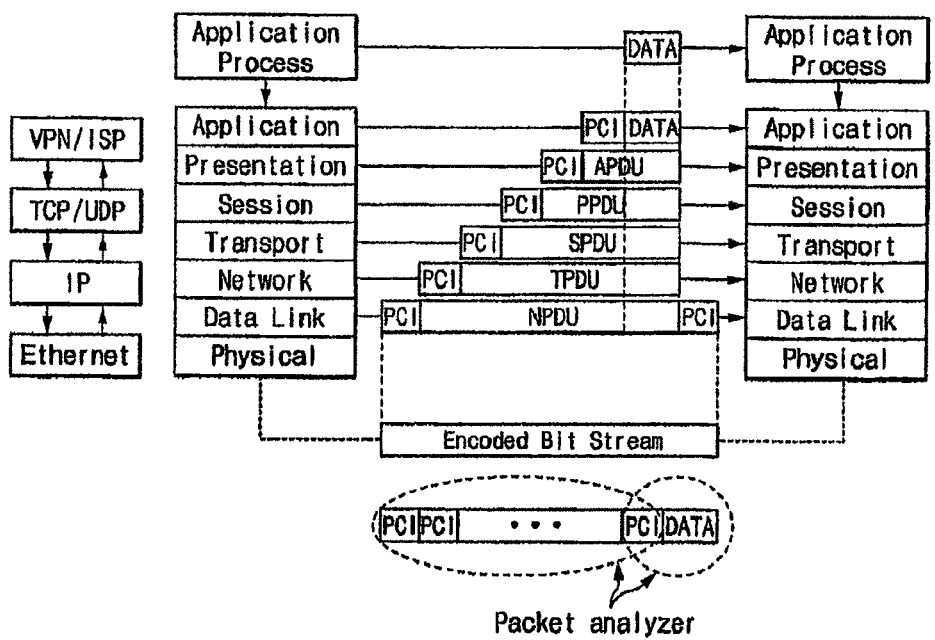
FIG. 23 shows a packet data traffic analysis concept for each layer of an OSI model by a packet analysis unit shown in FIG. 18.

Referring to FIG. 23, the packet analyzer 2520 receives encoded bit streams through the packet separator 2510 or the S/H and router 2600, analyzes the packet data for each layer of the OSI. (open systems interconnection) model, and finds per-subscriber destination IPs and packet data used by the subscriber 2100. Processes for the packet analyzer 2520 to eliminate each PCI from the encoded bit stream, analyze packet data and packet data traffic of the respective layers including a data link layer, a network layer, a transport layer, a session layer, a presentation layer, and an application layer, and find service usage information for each subscriber 2100, are very similar to those for the traffic analyzer 520 to analyze the packet data and the packet data traffic with reference to FIG. 8 in the first preferred embodiment, and accordingly, no corresponding descriptions will be provided.

The billing information storage unit 2530 receives billing information, that is, per-subscriber service usage information found by the packet analyzer 2520, and billing information on the subscriber 2100 conventionally generated by the IWF/PDSN 2400, processes them as single per-service billing information, and stores it.

The billing information storage unit 2530 transmits the subscriber's billing information which has per-service billing information to a billing process system (not illustrated) so as to bill the actual subscriber, and it includes a database for storing data, and a database manager for managing the stored data, and further includes means for using billing information provided by the packet analyzer 2520 and billing information provided by the IWF/PDSN 2400 to generate single per-service billing information, and storing the per-service billing information as the subscriber's billing information.

Per-service billing information is generated according to the wireless data service used by each subscriber, by analyzing the user packet data collected by packet separation or packet mirroring in the IP network, and generating per-subscriber service usage information.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, the analysis of the packet data traffic through the IP network in the wireless data service in the mobile communication network is effectively executed, and a lot more statistics and detailed information for investment on the mobile communication network are provided.

More stable wireless data services are provided to the subscribers since the services are monitored by the mobile communication network management service provider.

Also, more stable wireless data communication services are provided to the subscribers since the network for providing the wireless data service is wholly monitored by the mobile communication network management service provider.

In addition, per-service billing according to the various services used by the subscriber is allowed by the mobile communication network management service provider, and various service products are provided to the subscribers.

What is claimed is:

1. An analyzer for packet data traffic transmitted between a subscriber and a service server when the subscriber uses a wireless data service of a specific service server through a mobile communication network, comprising:
 a packet data separator that facilitates providing a wireless data service to the subscriber by the service server, wherein the packet data separator is configured to:
  separate user packet data transmitted between:
   a mobile communication exchange or the packet controller, and the service server, and
  receive the user packet data only after a radio-PDSN registration is provided,
  wherein the packet data separator is further configured to separate the user packet data based upon at least two layers of the user packet data;
 a traffic analyzer for separating the user packet data received through the packet data separator according to transmission directions, and analyzing the user packet data;
 a statistics storage unit for storing and managing result data analyzed by the traffic analyzer; and
 a statistics reference unit for retrieving various data stored in the statistics storage unit, and providing statistical information desired by the subscriber, wherein the statistics reference unit provides various real-time statistics data analyzed by the traffic analyzer to the subscriber through a GUI (graphical user interface),
 wherein the various real-time statistics data include statistics on communication amounts of receive data, transmit data, and receive and transmit data, access trials for each layer, a number of success times, a number of failure times, and current states, and further include usage statistics for each IP on each application, successful access rate statistics for each service, statistics on response times, and successful rate statistics on a PPP session for each base station.

2. The analyzer of claim 1, wherein the packet data separator has Ethernet access with the service server and with the mobile communication exchange or the packet controller, and separates the user packet data into transmit data and receive data.

3. The analyzer of claim 1, wherein the traffic analyzer separates the user packet data received through the packet data separator into transmit data and receive data, and analyzes the transmit data and the receive data.

4. The analyzer of claim 3, wherein the traffic analyzer analyzes a TCP (transmission control protocol) transmission flow between the service server and the mobile communication exchange or the packet controller through the user packet data.

5. The analyzer of claim 1, wherein a switching hub for transmitting packets to an appropriate port based on a packet address, and a router for connecting separated networks that use the same transmission protocol, are connected between the packet data separator and the service server.

6. A method for analyzing packet data traffic transmitted between a subscriber and a service server when the subscriber uses a wireless data service of a specific service server through a mobile communication network, comprising:
   (a) receiving and separating user packet data transmitted between a mobile communication exchange or a packet controller that facilitates providing a wireless data service to the subscriber, wherein the receiving and separating occurs only after a Radio-PDSN registration is provided;
   (b) separating the user packet data received in (a) according to transmission directions, and analyzing the user packet data, wherein separating the user packet data further comprises separating the user packet data based upon at least two layers of the user packet data; and
   (c) providing statistical information desired by the subscriber by using result data analyzed in (b), wherein providing statistical information comprises providing various real-time statistics data to the subscriber through a GUI (graphical user interface),
   wherein the various real-time statistics data include statistics on communication amounts of receive data, transmit data, and receive and transmit data, access trials for each layer, a number of success times, a number of failure times, and current states, and further include usage statistics for each IP on each application, successful access rate statistics for each service, statistics on response times, and successful rate statistics on a PPP session for each base station.

7. The method of claim 6, wherein (a) comprises:
separating the user packet data into transmit data and receive data, and receiving the user packet data via Ethernet access between the service server and the mobile communication exchange or the packet controller.

8. The method of claim 6, wherein (b) comprises:
separating the received user packet data into transmit data and receive data, and analyzing the transmit data and the receive data.

9. The method of claim 8, wherein a TCP transmission flow between the service server and the mobile communication exchange or the packet controller is analyzed through the user packet data.

10. A device for monitoring a service for a subscriber through an analysis of packet data traffic transmitted between the subscriber and a service server when the subscriber uses a wireless data service of a specific service server through a mobile communication network, comprising:
   a packet data separator that facilitates providing a wireless data service to the subscriber by the service server, wherein the packet data separator is configured to:
      separate user packet data transmitted between:
         a mobile communication exchange or the packet controller, and
         the service server, and
      receive the user packet data only after a Radio-PDSN registration is provided,
      wherein the packet data separator is further configured to separate the user packet data based upon at least two layers of the user packet data;
   a traffic analyzer for separating the user packet data received through the packet data separator according to transmission directions, and analyzing the user packet data;
   a statistics storage unit for storing and managing result data analyzed by the traffic analyzer;
   a service monitoring unit for generating information including normality states on the subscriber for each service through various data stored in the statistics storage unit, and providing the information to a manager; and
   a statistics reference unit configured to provide various real-time statistics data analyzed by the traffic analyzer to the subscriber through a GUI (graphical user interface),
   wherein the various real-time statistics data include statistics on communication amounts of receive data, transmit data, and receive and transmit data, access trials for each layer, a number of success times, a number of failure times, and current states, and further include usage statistics for each IP on each application, successful access rate statistics for each service, statistics on response times, and successful rate statistics on a PPP session for each base station.

11. The device of claim 10, wherein the packet data separator has Ethernet access with the service server and with the mobile communication exchange or the packet controller, and separates the user packet data into transmit data and receive data.

12. The device of claim 10, wherein the traffic analyzer separates the user packet data received through the packet data separator into transmit data and receive data, and analyzes the transmit data and the receive data.

13. The device of claim 10, wherein the traffic analyzer analyzes a TCP (transmission control protocol) transmission flow between the service server and the mobile communication exchange or the packet controller through the user packet data.

14. The device of claim 10, wherein the information including normality states on the subscriber for each service is generated by referring to statistical data on a number of trials and a number of success events separated by each service option, and statistics data on a number of service trials and a number of success events by TCP port numbers periodically or in real-time according to a request by the mobile communication network management service provider.

15. The device of claim 10, wherein a switching hub for transmitting packets to an appropriate port based on a packet address, and a router for connecting separated networks that use the same transmission protocol are connected between the packet data separator and the service server.

16. A method for monitoring a service for a subscriber through an analysis of packet data traffic transmitted between the subscriber and a service server when the subscriber uses a wireless data service of a specific service server through a mobile communication network, comprising:
   (a) receiving and separating user packet data transmitted between a mobile communication exchange or a packet controller that facilitates providing a wireless data service to the subscriber, by the service server, wherein the receiving and separating occurs only after a Radio-PDSN registration is provided;
   (b) separating the user packet data received in (a) according to transmission directions, and analyzing the user packet data, wherein separating the user packet data further comprises separating the user packet data based upon at least two layers of the user packet data; and (c) generating information including normality states on the subscriber for each service through result data analyzed in (b), and providing the information to a manager, and (d) providing various real-time statistics data, wherein the various real-time statistics data include statistics on communication amounts of receive data, transmit data, and receive and transmit data, access trials for each layer, a number of success times, a number of failure times, and current states, and further include usage statistics for each IP on each application, successful access rate statistics for each service, statistics on response times, and successful rate statistics on a PPP session for each base station.

17. The method of claim 16, wherein (a) comprises:
separating the user packet data into transmit data and receive data, and receiving the user packet data via Ethernet access between the service server and the mobile communication exchange or the packet controller.

18. The method of claim 16, wherein (b) comprises:
separating the received user packet data into transmit data and receive data, and analyzing the transmit data and the receive data.

19. The method of claim 18, wherein a TCP transmission flow between the service server and the mobile communication exchange or the packet controller is analyzed through the user packet data.

* * * * *